Figure 1:
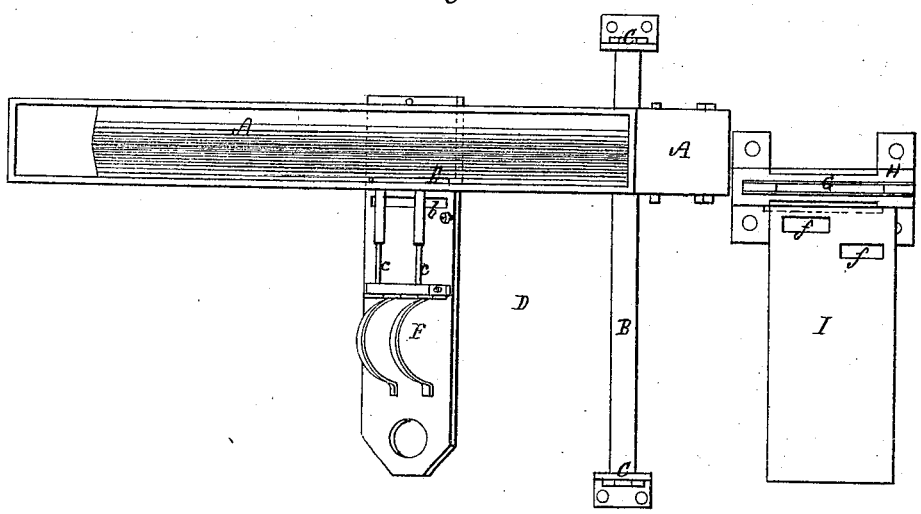

2 Sheets--Sheet 1.

H. P. FAIRFIELD.
Improvement in Machines for Distributing Nails for the Manufacture of Boots and Shoes.

No. 128,134. Patented June 18, 1872.

Witnesses.
H. P. Fairfield.

H. P. FAIRFIELD.
Improvement in Machines for Distributing Nails for the Manufacture of Boots and Shoes.
No. 128,134. Patented June 18, 1872.

Witnesses.
H. P. Fairfield.
by F. Curtis,
Att'y.

128,134

UNITED STATES PATENT OFFICE.

HADLEY P. FAIRFIELD, OF BOSTON, MASSACHUSETTS.

IMPROVEMENT IN MACHINES FOR DISTRIBUTING NAILS FOR THE MANUFACTURE OF BOOTS AND SHOES.

Specification forming part of Letters Patent No. 128,134, dated June 18, 1872.

Specification descriptive of certain Improvements in Machinery for Assorting and Distributing Nails for the Manufacture of Boots and Shoes, &c., invented by HADLEY P. FAIRFIELD, of Boston, Suffolk county, Massachusetts.

The purpose of this machine is to effect, automatically, the assorting and delivering of a quantity of nails, and of presenting them individually and successively to the action of the driving mechanism, by which they are inserted in the destined work; and to this end my invention, as explained in this context, consists, first, in the adoption of a horizontally-rocking or vibratory hopper or box, for containing a quantity of nails in a disordered condition, such hopper being constructed with an aperture in the bottom through which one nail may pass at a time, and having such bottom rising from each side inward, in order to deflect the mass of nails, or a certain number thereof, toward and over the delivering aperture, and insure the entrance to such aperture of one of their number with every rocking of the hopper; and secondly, these improvements consist in the employment, in connection with said rocking hopper, of a sliding gate, disposed immediately below the bottom of said hopper and its nail-delivering aperture and at right angles to both, and constituting, alternately, a bottom to close such aperture and retain the nail therein until the proper time arrives for its expulsion, or escape of such nail, the said gate being so constituted and combined with the hopper, and so actuated, by proper mechanical means, as to permit the discharge of the nail into the delivering-chute at the proper moment, and at all other times to retain one nail within such aperture and isolate the others from it, substantially as hereinafter explained; and thirdly, these improvements consist in the employment, in connection with the assorting-hopper or its equivalent, of a suitable upright chute or trough, and a horizontal plate sliding below it and pierced with two orifices, through one or the other of which the nail escapes, head downward, to the lower or discharging-mouth of the chute, the plate being driven in suitable reciprocations at right angles to the longest plane of the chute and the hopper, by suitable mechanism, in such manner as to advance its orifices in succession into coincidence with the chute, and allow the nail to escape through one of them, according to the position of the head of such nail, essentially as hereinafter explained; and fourthly, these improvements may be said to consist in an organized machine, composed of the assorting-hopper with its regulating-gate; the chute or conductor, and the tilting-plate, under an arrangement and operating as will now be described.

Figure 2:
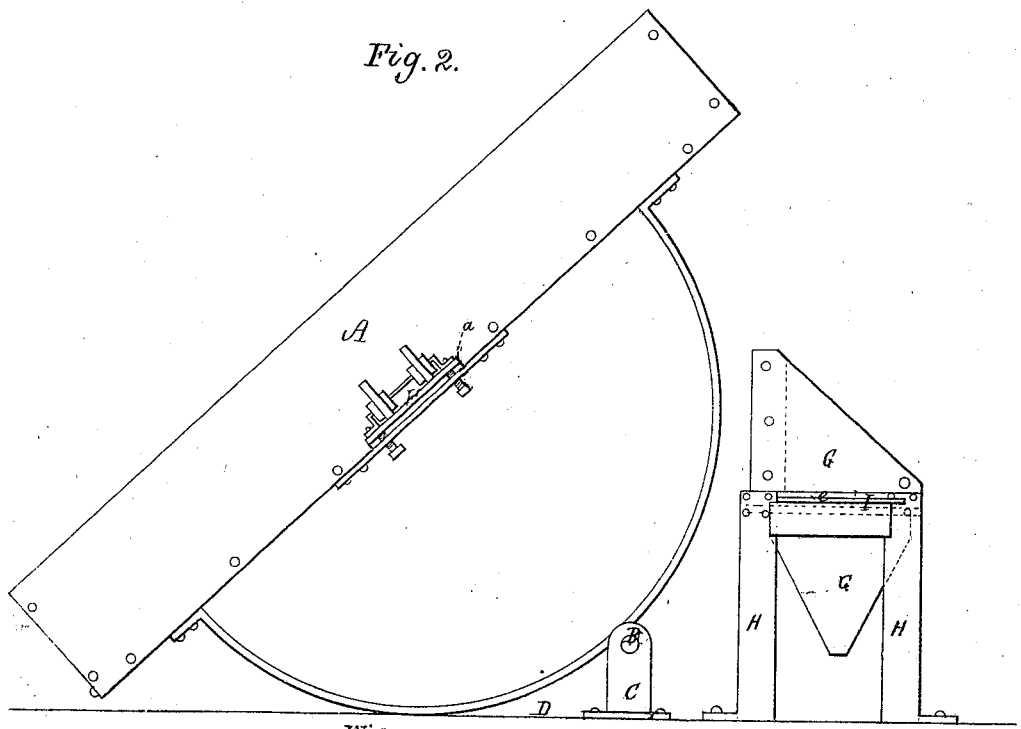
Figure 4:
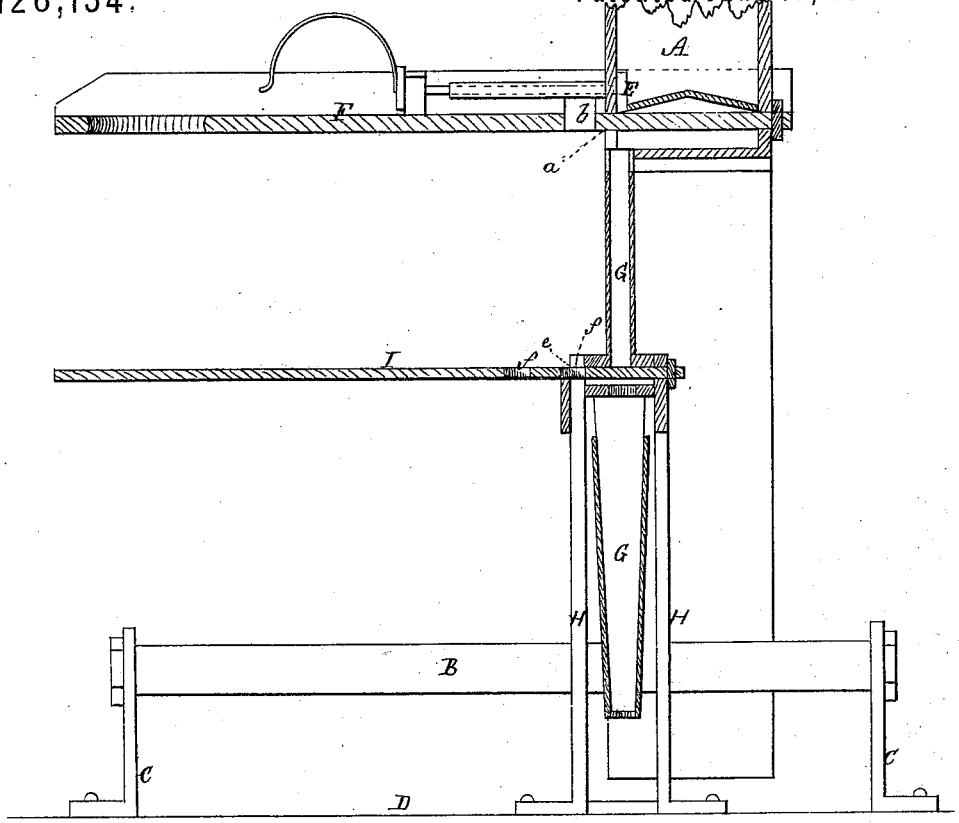
Figure 3:
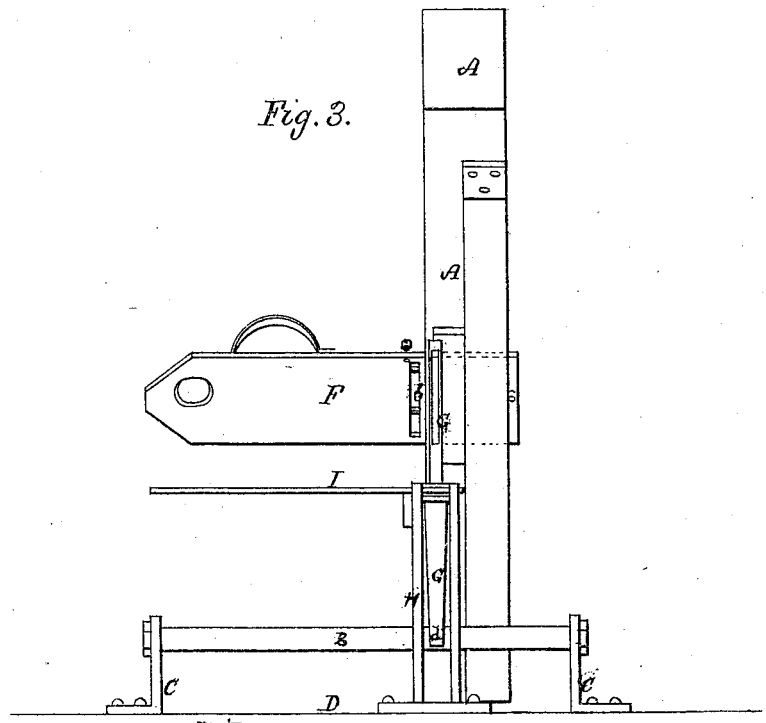

In the drawing accompanying this specification, Figure 1 is a plan, Fig. 2 a side elevation, Fig. 3 an end elevation, and Fig. 4 a vertical and transverse section, of a machine or portion of a machine embodying my improvements.

In the drawing, A represents a long rectangular box or hopper, open at top, and of a size and depth to contain a large quantity of nails, which are thrown into it in a loose, disordered condition, without care on the part of the attendant.

The hopper A is mounted upon a horizontal rock-shaft, B, which is supported in suitable bearings or standards, C, erected upon the base or support D of the machine, the rocking of the shaft, by suitable means, imparting a corresponding rocking motion of the hopper through the arc of a circle of a greater or less extent, as practice may determine, the rocking motion of such hopper, as a matter of course, compelling it to alternately tilt in one or the other direction, and causing the mass of nails therein, or a certain number of the lower ones, to slide to and fro of its bottom with each inclination, and lodge one of their number within a cell or aperture, E, which is created in said bottom, and to one side and about centrally thereof, as shown in Fig. 1 of the accompanying drawing. The longest axis of the aperture E is parallel to that of the hopper, and is of a length slightly in excess of that of a nail which the machine is intended to deliver, while the width of such aperture is likewise slightly greater than the largest diameter of such nail. The bottom of the hopper A is crowning transversely toward its center, in order to deflect the nails toward each side, in order that when only a few remain in it, one of their number shall, in sliding to and fro of its bottom, intercept and drop into the aperture or cell E.

F in the drawing represents a flat, rectangular, oblong plate or gate, of thin metal, this gate sliding within a cross-groove or channel, a, created in the bottom of the hopper and immediately below the aperture or slot E, and constituting, at certain times, a bottom to such slot, the depth of which is slightly greater than the greatest thickness of a nail. The gate F possesses a slot, b, created in it at right angles to its path of movement, and in parallelism with the aperture or cell E and hopper A such slot being equal to or somewhat greater than the cell, in order that a nail delivered through the latter shall find no obstruction from the plate when the two openings coincide.

The gate F thus formed constitutes, as before premised, at one time, a bottom to the aperture to convert it into a cell to retain the nail therein, and at another time, a continuation of such aperture, to permit of escape of the nail from such cell, and of its precipitation to the chute below. In order to hold back the mass of nails within the hopper at such time as the two apertures E and b coincide and form an opening from the hopper, I apply to the upper side of the gate F two rods, c c, so disposed as to enter the hopper at such time and span the aperture E, and to retreat from over such aperture when the gate is retracted.

In place of the rods a plate may be used, but in either event it will be desirable to employ a spring to advance the "holdback," in order that it may not abut against the mass of nails between it and the opposite side of the hopper, with injurious consequences.

G in the accompanying drawing represents a vertical chute or conductor, disposed below the hopper A, and to one side of the center of such hopper when it is in a horizontal position, the said chute being upheld by a proper frame or stage, H, and being in horizontal area somewhat greater than the orifice E. The bottom of the chute G is very much contracted, as shown at d, in order that a nail discharged thereat shall be compelled to pass endwise through it, while at some point intermediate between the two ends of such chute I dispose a thin, horizontal, flat plate, I, which intercepts and obstructs such chute by passing through a passage, e, which enters into the construction of the latter, the width of the plate I being preferably greater than the horizontal length of the chute.

Within the plate I and transversely thereof I create two orifices, f f, which constitute one of the primary novel features in this invention. These orifices are of a width greater, and of a length less than that of a nail, and are disposed one in advance of the other and closely together, and with their longest planes at right angles to that of the plate, and parallel to that of the chute. They are also disposed upon opposite sides of the center of said plate and chute, in order that one shall allow a nail to pass through it whose head or heavier end is situated at one end of the chute, and the other at the opposite end, the length and position of each orifice with respect to the longest plane of the chute, being such that a nail precipitated into the hopper and dropping upon the plate shall tilt upon the inner boundary or edge of one or the other orifices, (when such coincide with the chute,) and by the overbalancing or preponderating gravity of its head end, be precipitated from such plate into the chute below, and be delivered through the lower opening of the latter, the form of this chute being such that the nail is discharged therefrom head downward with unerring accuracy. Emerging from the chute G, the nails are conducted to the mechanism which presents them to the driving machinery, but which constitutes no part of my present invention.

In a machine as herein organized, the rocking or tilting of the hopper A in one direction is not a matter of importance, except that it should incline at such angle in both directions as to create a lively movement of the nails therein; but under the arrangement herein explained and shown, the hopper must come to a positive stop, with its aperture E directly over and coinciding with the mouth of the chute G, which result is arrived at by any simple mechanical means. Should the chute and its adjuncts be duplicated upon the opposite end of the hopper, a like precaution must be observed, and, in order to augment the capacity of the machine, the aperture E and gate F may be repeated upon the opposite side of the hopper.

As before observed, suitable mechanism is to be provided whereby the hopper A is rocked upon its pivot or bearing and the plates F and I driven in reciprocating traverses at right angles to the longest plane of the hopper A and chute G, the arrangement of parts being such that when the said hopper reaches its extreme inclined position in a direction toward the chute the gate F and its "holdback" are advanced, and the aperture or cell E is opened at bottom and closed at top, while with the next ensuing rocking of the hopper, and before it passes the summit of its movement, the gate-rods retreat and, upon the opposite descent, open the top and close the bottom of said aperture, thus permitting a nail to drop into the latter, while the others slide over it; the plate I being so operated in its turn that immediately after the aperture E is opened at bottom to allow the nail within it to escape the said plate begins to advance, and continues its advance at such a speed as to present both its orifices in coincidence with the aperture E before the hopper again goes through a circuit. The plate I may effect its retreat at any time during the next ensuing rocking of the hopper so long as it advances in time for its orifices to intercept the open aperture E, as stated.

The operation of this machine is to be thus described: Supposing the hopper A to be in the position shown in Fig. 1 of the drawing—that is to say, as at its extreme inclined position remote from the chute G, and containing a mass of nails in a loose and mixed-up state, the gate F being retracted, and its slot $b$ and fingers or rods $c\ c$ isolated from the aperture E, which is closed at the bottom by the plate to form a cell to receive a nail, the plate I in its turn being likewise withdrawn to its fullest extent, and its solid portion intercepting and closing the chute G—the hopper rocks upon its support in the direction of the chute G until it passes beyond a horizontal plane, and tilts in the opposite direction, upon which the nails, or a certain proportion of the lowermost ones, slide upon the bottom of the hopper, one of their number lodging in the cell E. The hopper continues to rock or tilt toward the chute until it brings up against its stops and arrives immediately over the mouth of such chute, the gate F in the interim, and subsequent to the lodgment of the nail, having been advanced by its actuating mechanism to its fullest extent and brought its slot $b$ into coincidence with the mouth of the chute at the moment the hopper reaches the latter, thus permitting the nail within the cell to drop through the said slot $b$ and into the chute, and deposit itself upon the sliding plate I, which has not begun its advance, the fingers $c\ c$ before named having advanced with the gate and pushed before them any nails which might otherwise prematurely enter the slot. The hopper next begins a return movement or rocking motion away from the chute, and at the same time the gate F and its fingers $c\ c$ recede and close the bottom of the aperture E and removes the fingers from over its mouth, the hopper continuing its movement until, having passed beyond a horizontal plane, it reaches its extreme position over the opposite slope, the mass of nails within such hopper shifting about during the movement, and depositing one of their number within the cell E, the plate I having in the mean time been advanced until its outermost orifice has passed beyond the interior of the chute. During the passage of the orifices $f\ f$ of the plate I past the chute, which they intercept, the nail has tilted upon the edge of one of them, according to the position of its head, owing to the preponderating gravity of such head, and been precipitated head downward into the said chute and discharged from the lower end thereof, preserving, in the passage, its inverted position, as before stated. The hopper A now begins its rocking movement toward the chute, as at first, and continues such movement, as stated, until it arrives immediately over such chute, the plate I having in the interim been retracted by its operative mechanism and closed passage through the chute, as stated. The machine thus becomes self-acting and its functions continuous until all the nails within the hopper have been disposed of.

This machine possesses several advantages over its predecessors: First, it is of extreme comparative simplicity in construction and certainty in operation, and is not liable to derangement; second, should a nail of a size larger than the machine is intended for find its way to the chute it may be easily and expeditiously removed; third, the hopper containing the nails is open and very accessible at all times for inspection of its interior or its contents.

I would here remark that in lieu of the plate I sliding transversely of the chute G, as explained, and containing two orifices, I have contemplated the employment of a narrow plate containing one longitudinal slot and sliding longitudinally to and fro of the chute, the head-end of the nail overhanging one or the other end of such slot during a reciprocation of the plate.

Claims.

What I claim as my invention, and desire to secure by Letters Patent, is as follows:

1. In machinery for assorting and distributing nails, a rocking or tilting nail-hopper provided at its bottom with one or more slots or apertures, each of which is alternately and at proper intervals closed to constitute a chamber to receive one of the nails of the mass within the vibrating hopper, and then opened to permit the escape or discharge of the nail thus laid into it, substantially as herein shown and set forth.

2. In combination with the rocking or tilting nail-hopper having one or more slots or apertures in its bottom alternately closed and opened, substantially as specified in the preceding clause, the "holdback"-fingers or their equivalent, arranged to move over said aperture or apertures so as to prevent the nails above from entering and falling through the same when opened, substantially as herein shown and set forth.

3. In a rocking or tilting nail-hopper, operating as described, the formation of the bottom of the same substantially in the manner herein specified, in order to deflect the nails toward the nail receiving and discharging aperture or apertures during the movement of the hopper.

4. In machinery for assorting and distributing nails, the combination of a rocking or tilting nail-hopper provided with one or more nail receiving and discharging apertures, mechanism whereby said apertures may be alternately and at proper intervals closed and opened, and a chute or conduit for receiving and conducting the nails delivered to it from said hopper, said parts being arranged and operating together substantially in the manner herein shown and set forth.

5. In combination with the nail conducting and delivering chute, a slotted or equivalently-formed slide playing across the chute so as to alternately close the passage through the same, in order to receive and hold the nail dropping upon it, and then open said passage to permit the further descent of the nail head downward through the remainder of the chute, substantially as herein shown and described.

6. The reciprocating slide playing transversely across the chute at a point intermediate between its two ends, and containing two slots or openings, arranged, with relation to one another and the chute, substantially in the manner herein shown and described, so that the head of the nail resting on said slide shall, during the movement of said slide, be received in one or the other of said openings, and the nail to be tilted and precipitated head downward through said aperture, substantially as herein shown and described.

7. An apparatus for assorting and delivering nails, consisting of a rocking or tilting nail-hopper, with one or more nail receiving and discharging apertures in its bottom, mechanism for opening and closing said apertures, a nail receiving and conducting chute, and a reciprocating slide intermediate between the two ends of said chute for alternately closing and opening the passage in the same, said parts being organized and operating in relation to each other substantially in the manner and for the purposes herein shown and set forth.

H. P. FAIRFIELD.

Witnesses:
   FRED. CURTIS,
   W. E. BOARDMAN.